US006942359B2

(12) United States Patent
Furth et al.

(10) Patent No.: US 6,942,359 B2
(45) Date of Patent: Sep. 13, 2005

(54) FLASHLIGHT THAT CAN OPERATE WITH ALTERNATIVE SIZE BATTERIES

(75) Inventors: David A. Furth, Skaneateles, NY (US); Richard H. Chapman, Camillus, NY (US); Scott W. Osiecki, Skaneateles, NY (US); David R. Dalton, Turramurra (AU)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/730,343

(22) Filed: Dec. 8, 2003

(65) Prior Publication Data

US 2005/0122715 A1   Jun. 9, 2005

(51) Int. Cl.⁷ .................................. F21L 4/04
(52) U.S. Cl. .................. 362/205; 362/204; 200/60; 429/97; 439/500
(58) Field of Search ............. 362/194–208, 362/171, 178; 439/500; 429/97; 200/60

(56) References Cited

U.S. PATENT DOCUMENTS

| | | | | |
|---|---|---|---|---|
| 4,563,727 A | * | 1/1986 | Curiel | 362/183 |
| 4,607,207 A | | 8/1986 | Bruneau | 320/2 |
| 5,167,447 A | * | 12/1992 | Gonzales | 362/202 |
| 5,489,485 A | * | 2/1996 | Peot et al. | 429/99 |
| 5,606,238 A | * | 2/1997 | Spellman et al. | 320/110 |
| 5,686,811 A | * | 11/1997 | Bushong et al. | 320/110 |
| 5,909,062 A | | 6/1999 | Krietzman | 307/64 |
| 6,046,572 A | | 4/2000 | Matthews et al. | 320/116 |
| 6,388,390 B2 | * | 5/2002 | Rachwal | 315/200 R |
| 6,851,828 B1 | | 2/2005 | Hansen | 362/203 |
| 2003/0189826 A1 | * | 10/2003 | Yoon | 362/205 |
| 2004/0090777 A1 | * | 5/2004 | Lee | 362/202 |

FOREIGN PATENT DOCUMENTS

| | | | | |
|---|---|---|---|---|
| JP | 09-320552 | * | 12/1997 | H01M 2/10 |
| JP | 10-144273 | * | 5/1998 | H01M 2/10 |
| JP | 2000-040402 | * | 2/2000 | F21L 4/00 |
| JP | 2000-208117 | * | 7/2000 | H01M 2/10 |

* cited by examiner

*Primary Examiner*—Stephen Husar
*Assistant Examiner*—Jason Han
(74) *Attorney, Agent, or Firm*—Stewart A. Fraser

(57) ABSTRACT

Various embodiments of a flashlight are provided. In one representative embodiment a flashlight includes a light source, a housing and at least two battery locations inside the housing. Each battery location inside the housing can accommodate at least one of at least two batteries, each of which can be a different size. The flashlight also includes an electro-mechanical structure that prevents a closing of an electrical circuit that electrically couples the batteries to the light source, when one of the at least two batteries in the flashlight is a different size than another.

28 Claims, 11 Drawing Sheets

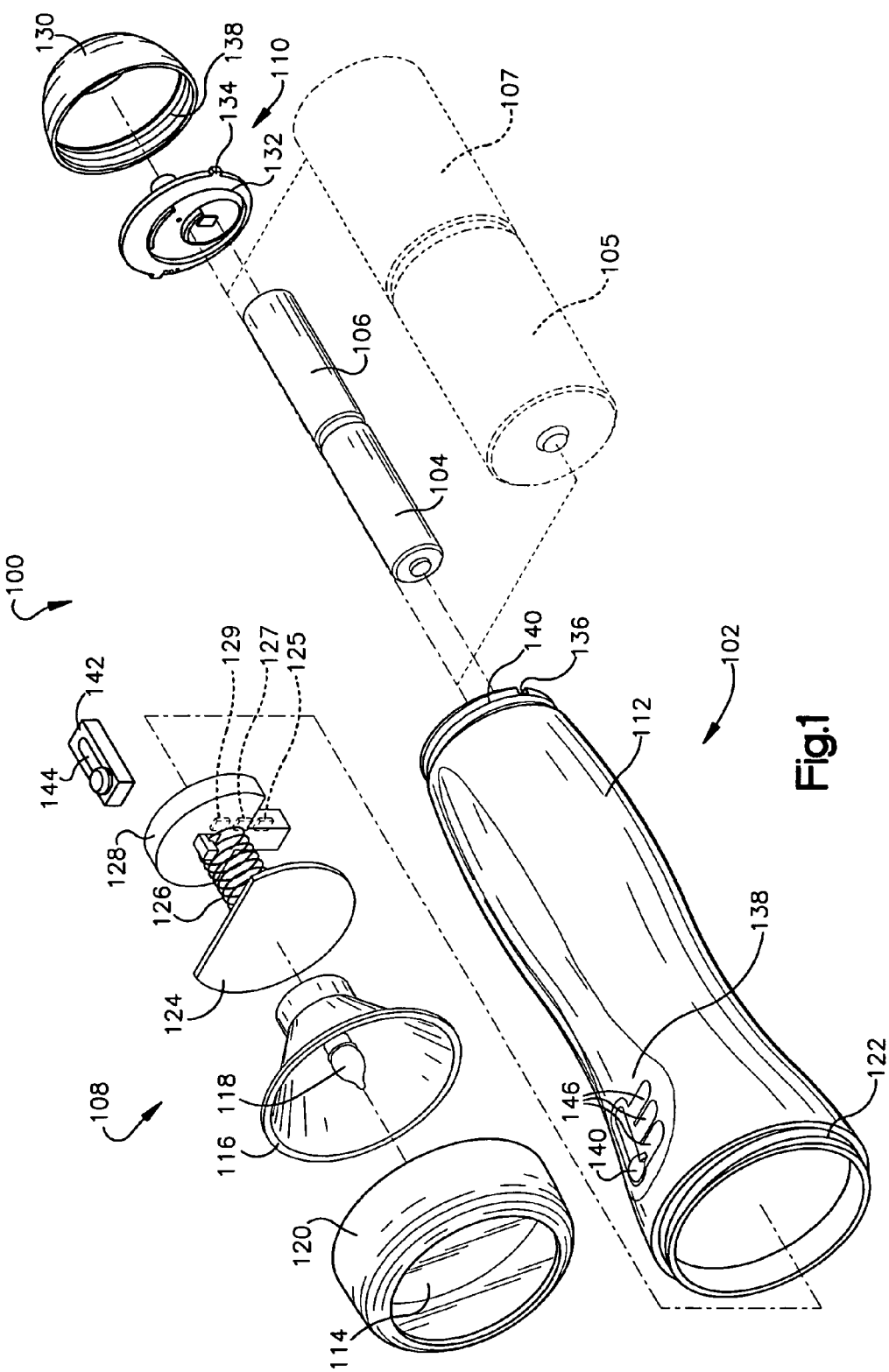

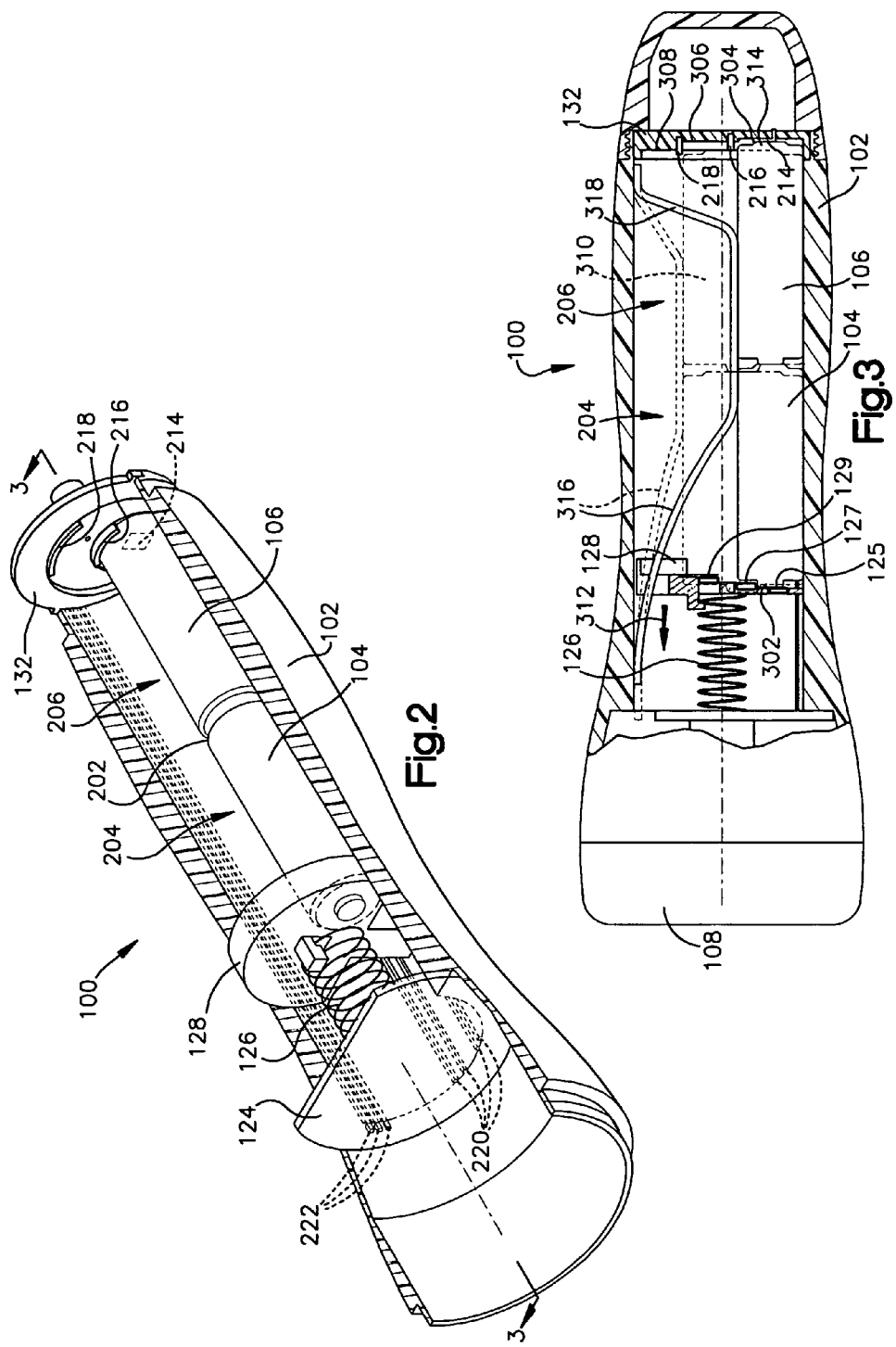

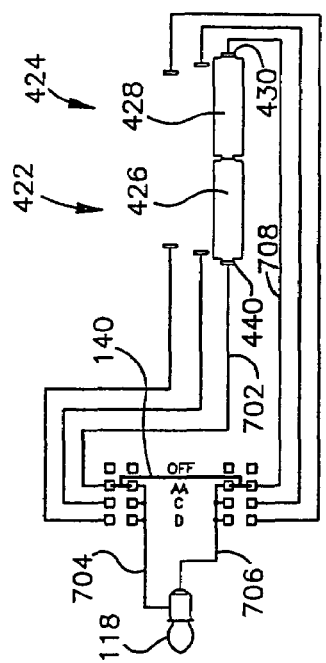
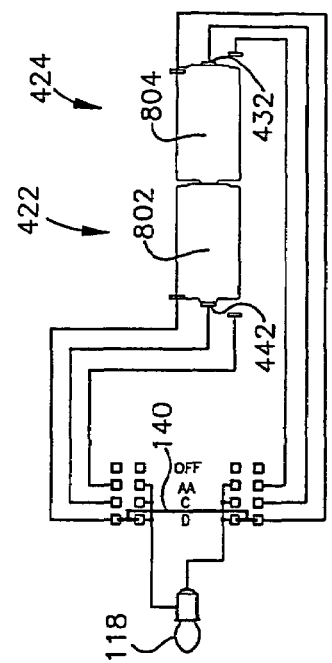
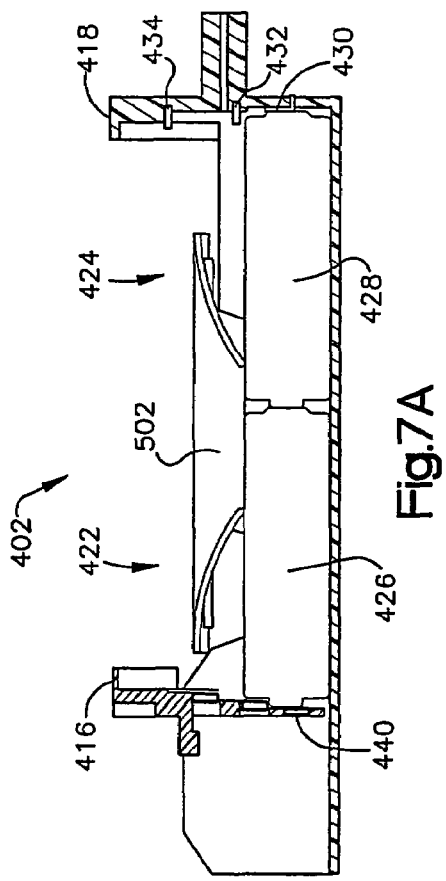
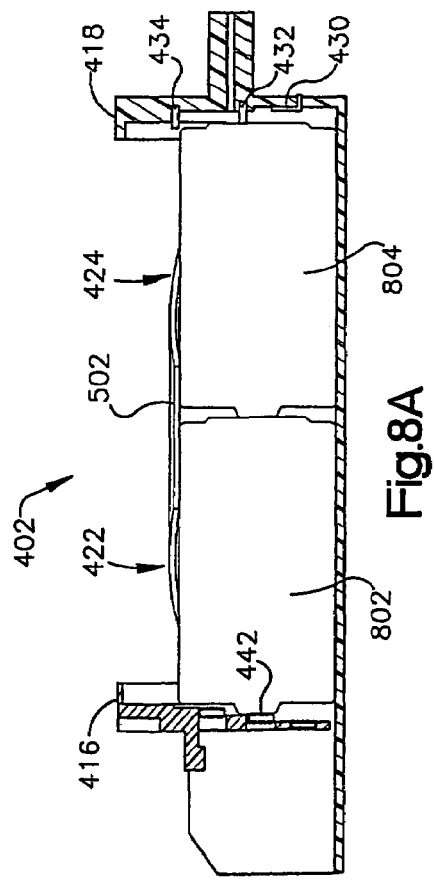

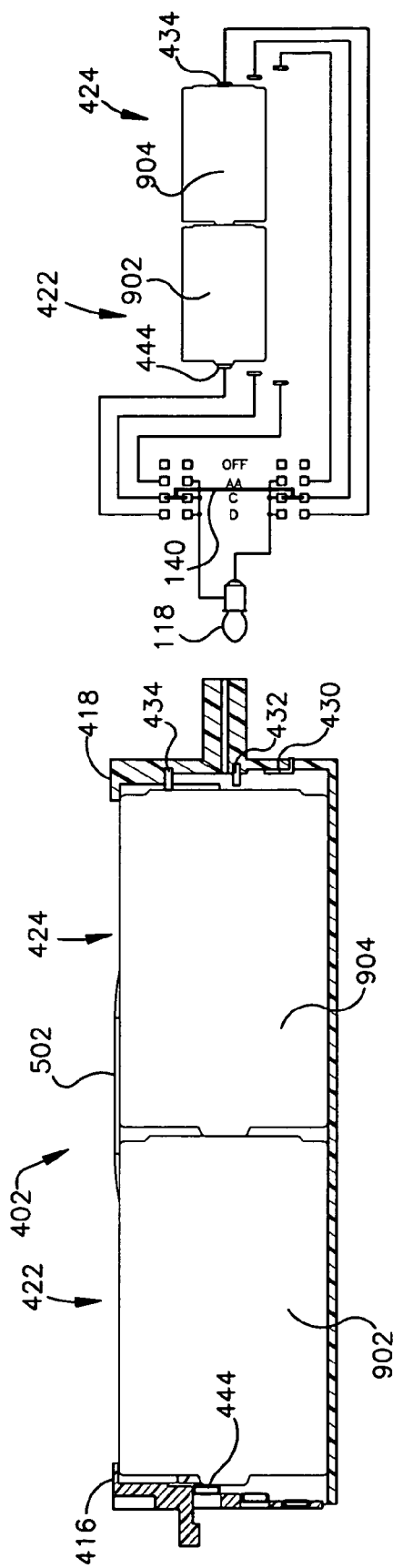

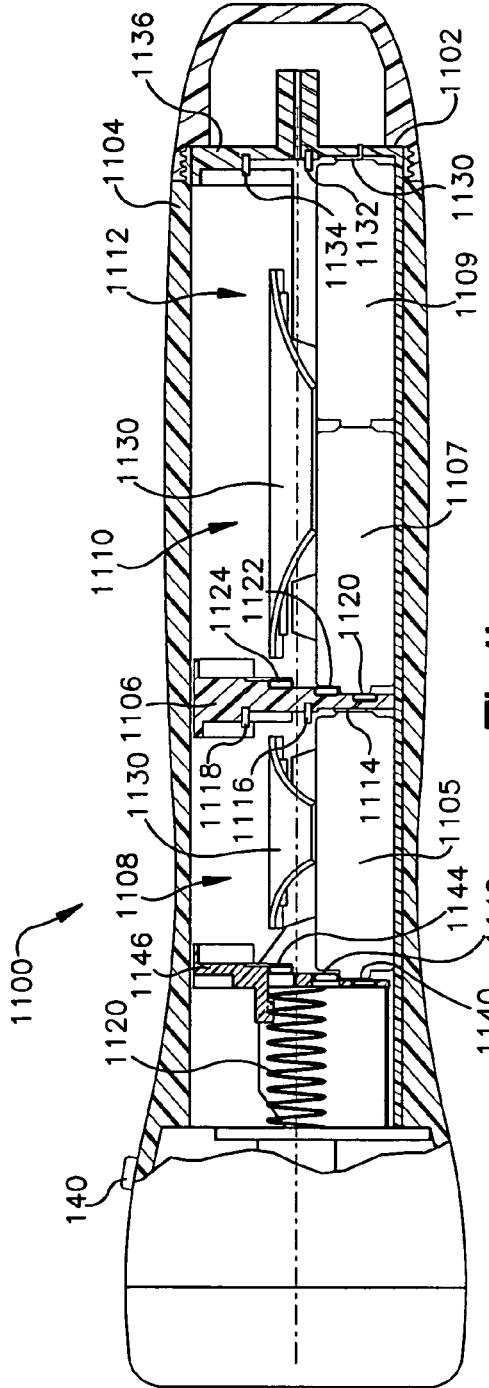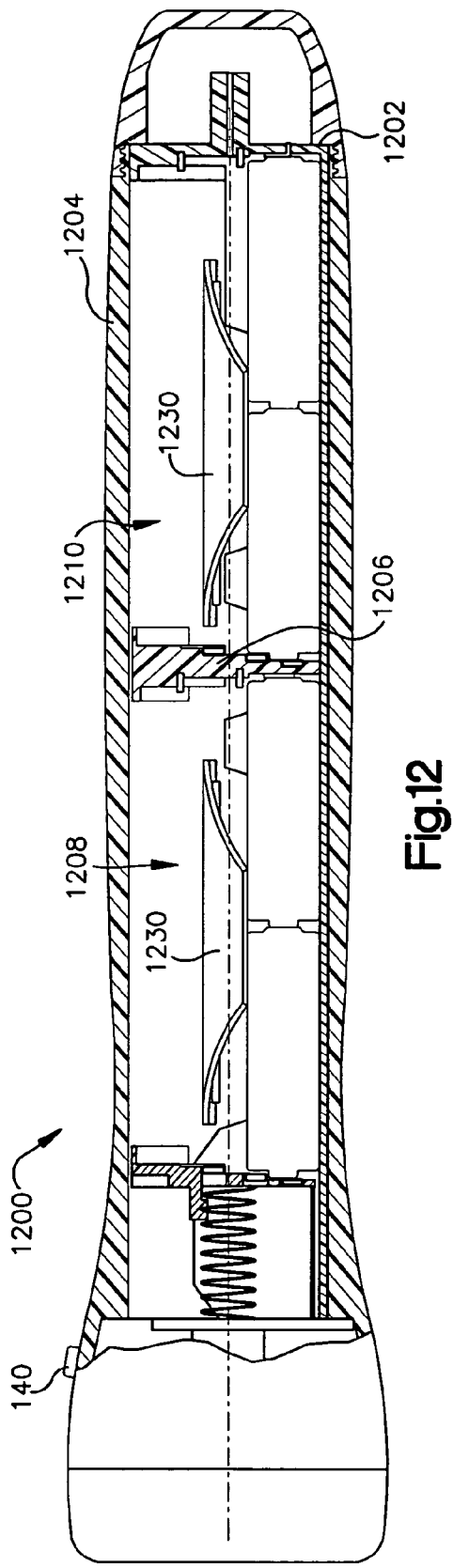

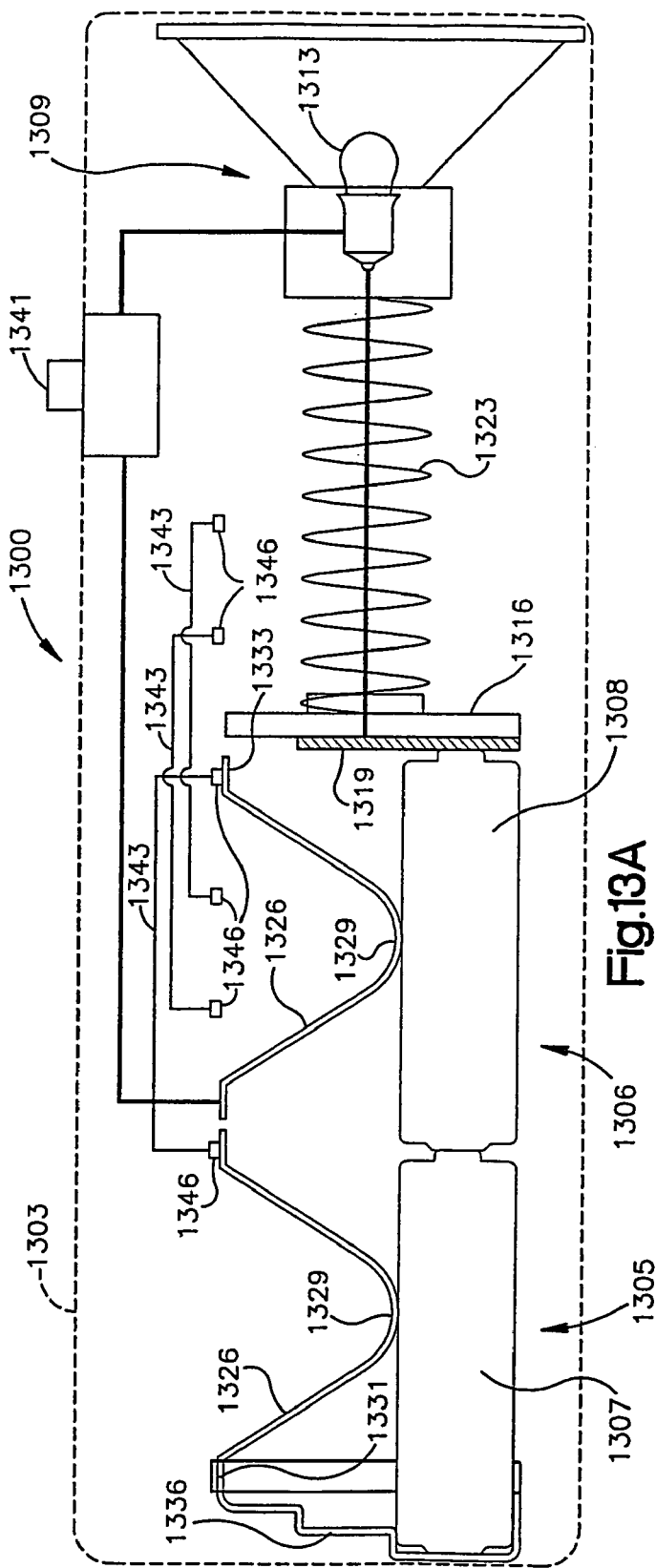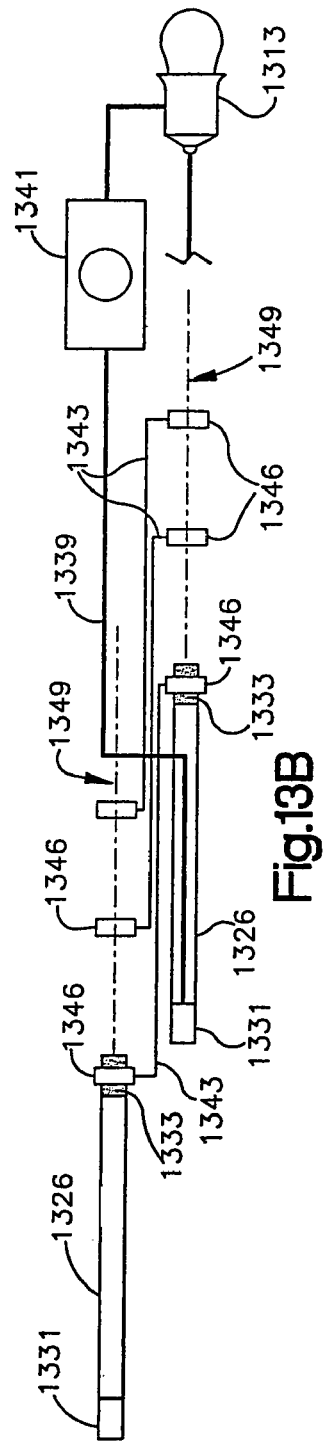

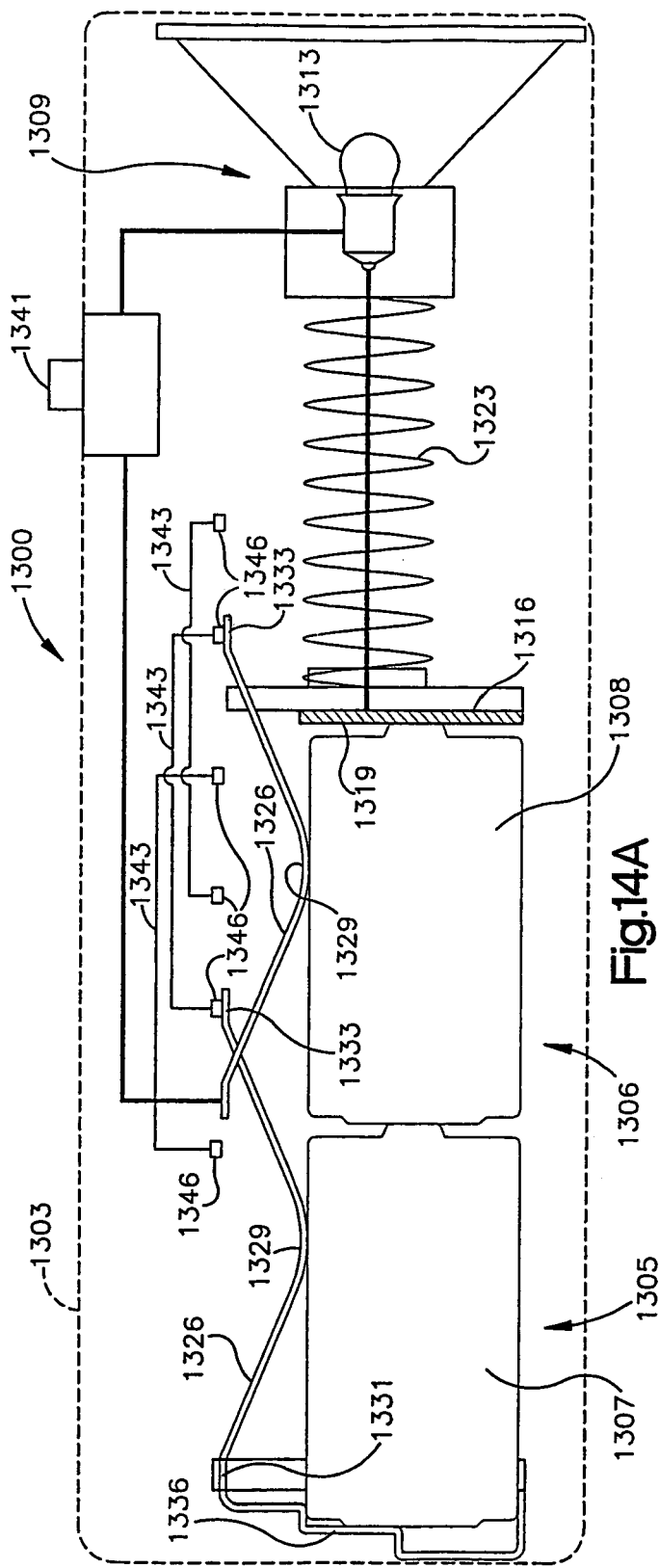
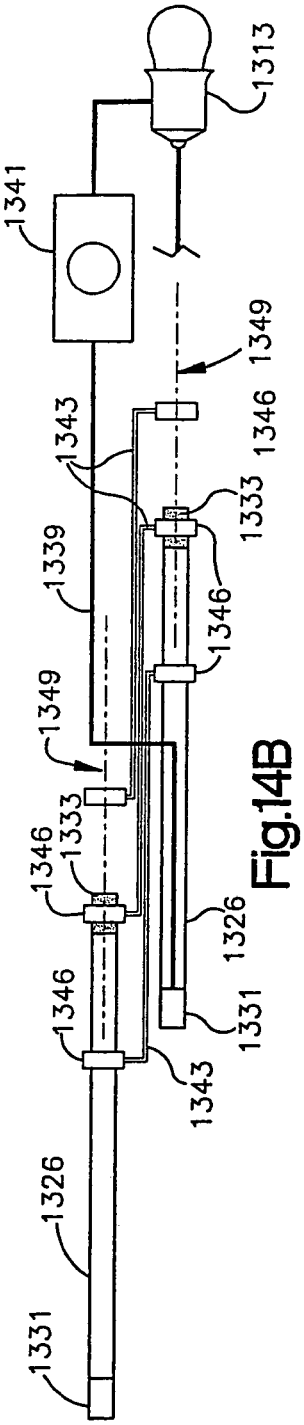
Fig.14A
Fig.14B

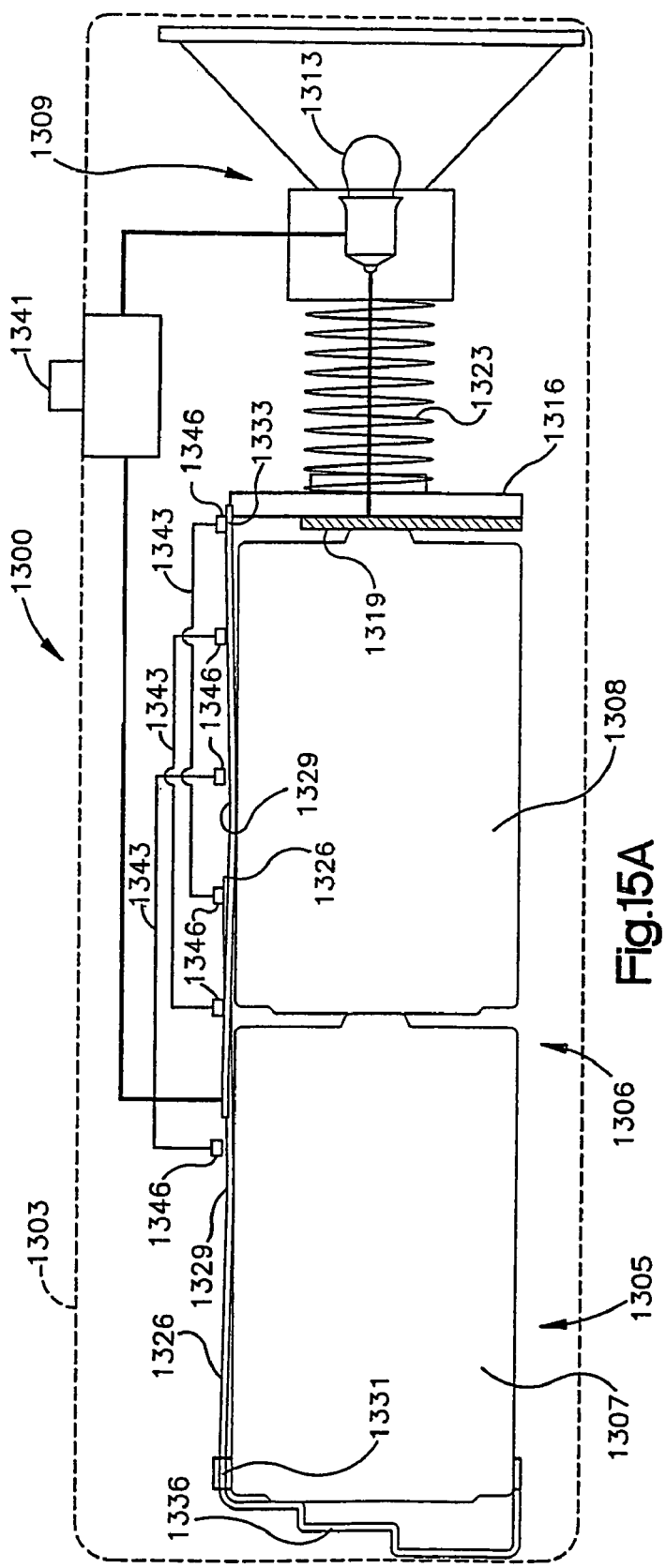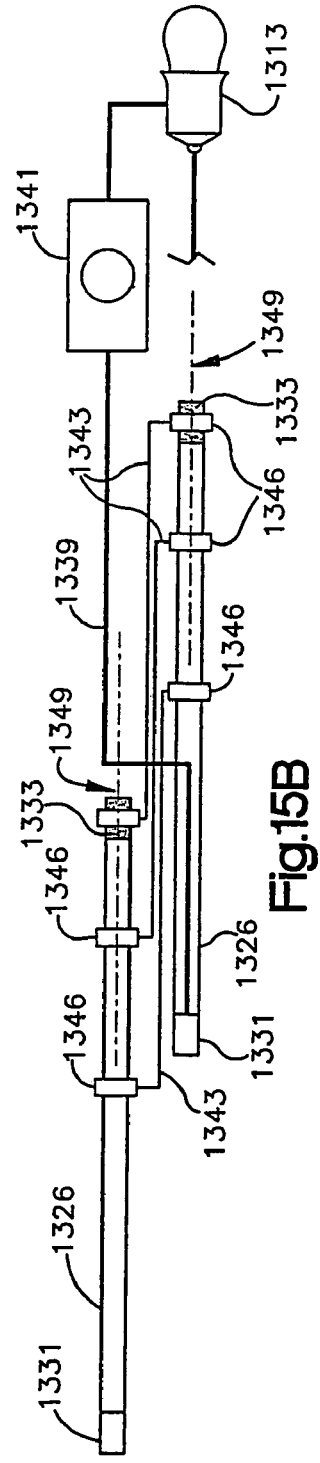

FLASHLIGHT THAT CAN OPERATE WITH ALTERNATIVE SIZE BATTERIES

BACKGROUND

The present invention generally relates to flashlights.

Conventional flashlights include a housing which is typically sized to contain two or more batteries. The housing includes a head assembly with a light source at one end of the housing and an end cap assembly at another end of the flashlight, opposite the head assembly. The central portion of the housing between the head assembly and the end cap holds the batteries and can serve as a handle for the flashlight. The end cap assembly, and in some cases the head assembly can be removed to insert batteries. When charged batteries are inserted, an on/off switch can be activated to form an electric circuit between the batteries and the light source to generate light.

Conventional flashlights are typically designed to contain batteries of only one size, that is, batteries that have the same diameter and length. These flashlights can present an inconvenience or problem if the particular size battery needed to operate the flashlight is not on hand. To overcome this problem, flashlights have been developed to house batteries of two or more different sizes, and these designs allow for an electric circuit to be established through two different size batteries positioned in a series arrangement. Such an arrangement, however, can result in a safety problem when terminals of two different size batteries contact one another. For example, when the electrical energy supplied by the smaller of the two batteries is depleted, the larger of the two batteries continues to charge and to generate internal gas within the battery due to chemical reaction. The pressure generated by internal gassing can cause battery fluid to leak from the flashlight and create a harmful situation.

In other flashlights, the housing is large enough to contain batteries of different sizes. The batteries are located in separate compartments inside the housing according to the size of the battery and different size batteries operate on separate electrical circuits. For example, in a flashlight having a housing that is sized to accommodate two C size batteries and two D size batteries, the C size batteries and the D size batteries can operate the flashlight on separate electrical circuits. The problem, however, is that such a design can require that the housing be relatively large and bulky.

SUMMARY

The flashlight of the present invention allows the use of at least two battery sizes so long as multiple batteries used in conjunction with each other are of the same physical size. In one embodiment of the invention, the flashlight includes a light source, a housing, and at least two battery locations internal to the housing for the positioning of at least two batteries. Each of the battery locations is capable of accommodating one of the at least two batteries, where each of the at least two batteries can be one of various sizes. The flashlight further includes electro-mechanical structure that prevents a closing of an electrical circuit that electrically couples the batteries to the light source when the batteries in the flashlight are different sizes.

In one embodiment, the flashlight of the present invention can include a switch that prevents a closing of an electrical circuit that electrically couples the batteries in the flashlight to the light source when the batteries in the flashlight are different sizes. The switch can be for example, a two-pole, multiple-position switch. In another example embodiment, the flashlight can further include a retaining member that impinges on the batteries to hold them in place in the battery locations. Each battery location can include at least two battery contacts to be contacted by one battery of a predefined size. The battery contacts inside the housing can be spaced apart relative to one another so that each contact can be touched by the battery of the corresponding predefined size. The switch can electrically couple the battery contacts to the light source when the at least two batteries in the flashlight are substantially the same physical size, and the switch prevents a closing of the electrical circuit that couples the batteries to the light source when at least one battery in the battery locations is a different size than the others.

In another embodiment of the invention, the flashlight includes a leaf spring associated with each battery position. Each of the leaf springs includes an apex that projects into the respective battery position. When batteries are positioned in the battery locations, the apexes of the leaf springs are displaced by the side of the battery. When so displaced, a moveable end contact of each of the leaf springs comes into contact with one of a number of bridge conductors. When the batteries positioned in the battery locations are of the same size, the bridge conductors electrically couple at least one of the leaf springs to a second one of the leaf springs. In this respect, an electrical circuit can be established through the leaf springs to apply power to a light source of the flashlight. If batteries of two or more sizes are placed in the battery locations, then the electrical circuit is not established, and consequently, the power from the batteries is prevented from reaching the light source.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 1 is an exploded perspective view of a flashlight, according to an embodiment of the invention;

FIG. 2 is a perspective cut-away view of the flashlight of FIG. 1 according to an embodiment of the invention;

FIG. 3 is a cross-sectional view of the flashlight housing taken along lines 3—3 of FIG. 2 according to an embodiment of the invention;

FIG. 7A is a cross-sectional view of the flashlight of FIG. 4 containing AA size batteries according to an embodiment of the invention;

FIG. 7B is a representative schematic of the electrical circuit in the flashlight of FIG. 7A according to an embodiment of the invention;

FIG. 8A is a cross-sectional view of the flashlight of FIG. 4 containing C size batteries according to an embodiment of the invention;

FIG. 8B is a representative schematic of the electrical circuit in the flashlight of FIG. 8A according to an embodiment of the invention;

FIG. 9A is a cross-sectional view of the flashlight of FIG. 4 containing D size batteries according to an embodiment of the invention;

FIG. 9B is a representative schematic of the electrical circuit in the flashlight of FIG. 9A according to an embodiment of the invention;

FIG. 11 is a cross-sectional view of a flashlight that contains three batteries according to an embodiment of the invention;

FIG. 12 is a cross-sectional view of flashlight that contains four batteries according to an embodiment of the invention; and FIG. 13A is a cross-sectional schematic of a flashlight containing AA size batteries according to an embodiment of the present invention;

FIG. 13B is a representative schematic of the electrical circuit in the flashlight of FIG. 13A according to an embodiment of the invention;

FIG. 14A is a cross-sectional schematic of a flashlight containing C size batteries according to an embodiment of the present invention;

FIG. 14B is a representative schematic of the electrical circuit in the flashlight of FIG. 14A according to an embodiment of the invention;

FIG. 15A is a cross-sectional schematic of a flashlight containing D size batteries according to an embodiment of the present invention; and FIG. 15B is a representative schematic of the electrical circuit in the flashlight of FIG. 15A according to an embodiment of the invention.

DETAILED DESCRIPTION

Figure 4:
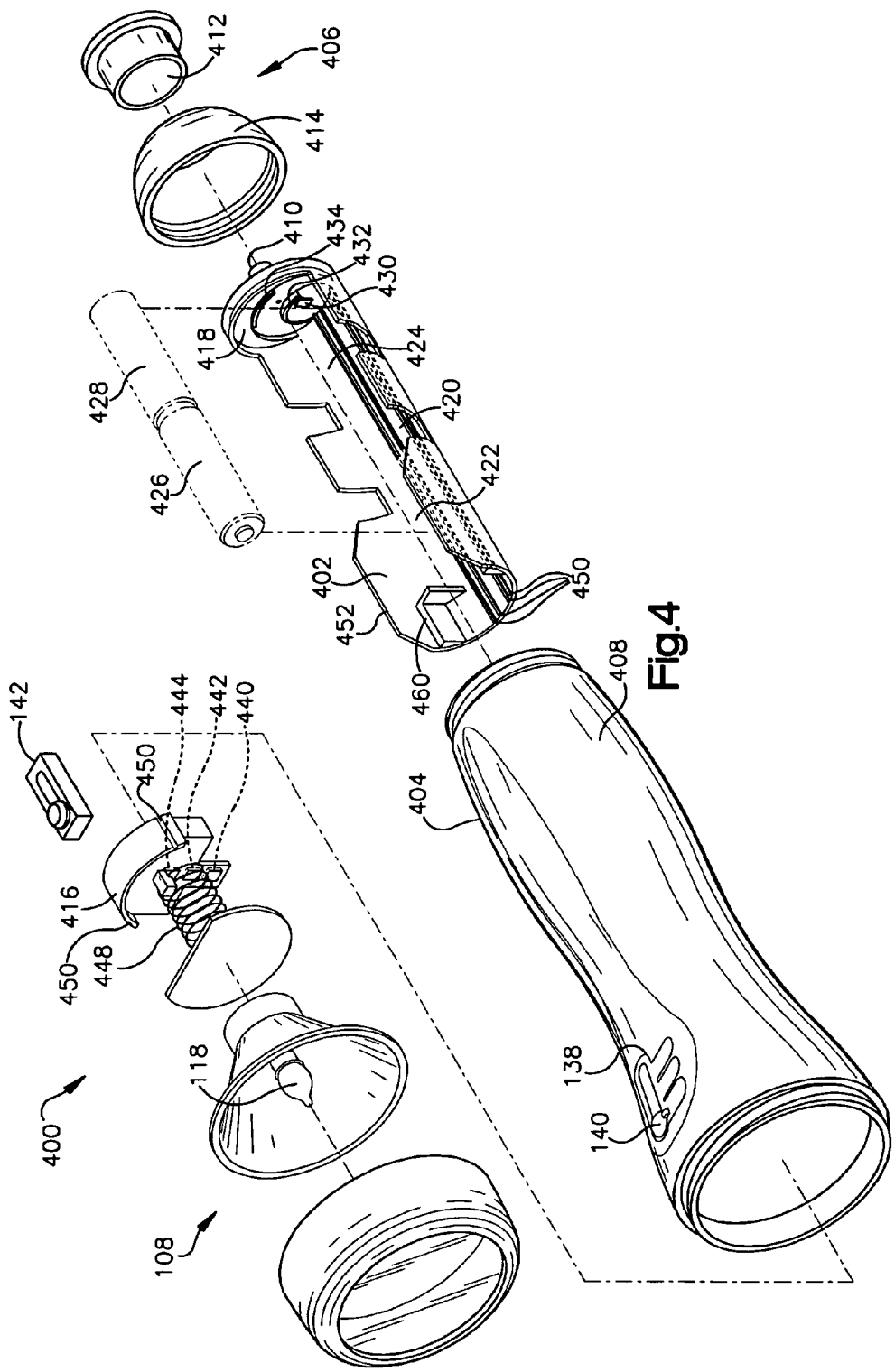
FIG. 4 is an exploded perspective view of a flashlight according to another embodiment of the invention.

FIG. 1 is a perspective exploded view of flashlight 100 in an example embodiment of the present invention. Flashlight 100 includes a housing 102 which contains batteries 104, 106 and other flashlight components which will be described, and is enclosed at a first end by a head assembly 108 and is enclosed at a second end by an end cap assembly 110. The flashlight housing 102 has a shape which is generally shown as cylindrical, however, several shapes, for example quadrilateral or prismatic cross-sections, are possible. Central portion 112 of housing 102 is sized to contain batteries of at least two different sizes, for example a pair of small batteries 104, 106, and a pair of larger batteries 105, 107 (shown in phantom). The housing 102 can also be sized to contain three, four or more batteries of different sizes. The flashlight 100 includes electro-mechanical structure that prevents the illumination of the light source when the batteries placed in the housing differ in size and will be further described below.

The head assembly 108 includes a lens 114, the reflector 116, a light source 118, and a retainer 120. The retainer 120 is a removable portion of the housing that secures as well as allows access within the housing. The retainer 120 can include engaging threads (not shown) formed on the interior surface of the retainer to engage with mating threads 122 formed on the protruding surface of the central portion of housing 102. The light source 118 can be one of many light sources, including but not limited to, an incandescent lamp or a light emitting diode, for example. The head assembly 108 is connected to an internal assembly that includes a wall 124, a spring 126 and a front insulator receptacle 128 which has three battery contacts 125, 127, 129 (shown in phantom).

End cap assembly 110 can include end cap 130 and rear insulator receptacle 132. The rear insulator receptacle 132 can include tabs 134 that fit inside grooves 136 of flashlight housing 102 to prevent rotation of the rear insulator receptacle when the end cap assembly 110 is assembled onto the housing 102. The end cap assembly 110 can include a region of internal threading 138 which engages mating threads formed on the exterior surface of the housing 102 so that end cap assembly 110 can be removed to insert and remove batteries 104, 106 from the central portion of the housing 102. The head assembly 108 and the end cap assembly 110 can further include a sealing element (not shown), for example an o-ring, at the interface between the retainer 120 and the central portion of the housing 102 and between the end cap 130 and the central portion of the housing 102 to provide a water tight seal.

Optionally, the batteries 104, 106 can be accessed by a door (not shown) in the central portion of housing 102 that can be opened to access the batteries rather than opening the end cap assembly 110. The door can be hinged to the housing, for example, by suitable projections formed on the door and inserted within holes formed in the housing.

The housing 102 can also include a battery selector panel 138 having a switch 140. The switch box 142 of the switch 140 has a slot 144 so that the switch 140 can be moved into contact with a plurality of contacts (not shown) inside switch box 142. The switch 140 is movable in at least two positions to close an electrical circuit thereby applying power to the light source 118. The switch 140 is shown as a slidable switch moving along a single axis to the various positions, however, the switch 140 can move in alternative motions, such as rotational and two-directional motions, for example. The switch 140 controls whether or not a closed electrical circuit is created that applies the power from the batteries 104, 106 to the light source 118 as will be further described below.

The battery selector panel 138 indicates the three positions of the switch 140, such as, two AA batteries, two C batteries, and two D batteries, for example, for a flashlight 100 that can contain three sizes of batteries. The flashlight 100 can be turned on and generate light when the position of the switch indicated on the selector panel 138 corresponds to the same size batteries inside the housing 102. For example, when the switch 140 is positioned at the two AA size batteries on the battery selector panel 138 and two AA size batteries are positioned inside the flashlight 100, power from the batteries is applied to the light source 118. If the switch 140 is moved to a position that indicates a size battery that differs from the size batteries of the batteries inside the housing 102, for example, the battery selector panel 138 indicates two AA batteries and the batteries inside the housing 102 are two D size batteries, then no closed electrical circuit can be made and no power from the batteries will be applied to the light source 118. However, a user may move the switch 140 into the D position that corresponds to the two D size batteries on the battery selector panel 138 to close the electrical circuit and activate the light source 118. Also, if two batteries of different size are placed in the housing 102, then no electrical circuit will be made regardless of the position of the switch and the flashlight 100 will remain off.

Optionally, the switch 140 may include an additional "off" position. In such a position, the switch 140 does not electrically couple the light source to the battery contacts, and the flashlight 100 will always be off. Therefore, in a four-position switch shown in the example embodiment of FIG. 1, it may be possible to make an electrical circuit through flashlight 100 when the switch 140 is moved to three of the four possible positions indicated on the battery selector panel provided that the batteries are of the proper size.

FIG. 2 is a longitudinal perspective cut-away view of the flashlight 100 of FIG. 1 having an electro-mechanical structure according to an embodiment of the invention. The electro-mechanical structure of flashlight 100 can include a front insulator receptacle 128, a rear insulator receptacle 132, and a seating portion 202 of housing 102 which define a battery compartment having a first battery location 204 and a second battery location 206 for the placement of batteries 104, 106. Each battery location 204, 206 is sized to accommodate a single battery, and the single battery can be one of at least two distinct sizes. That is, each of the at least two battery locations 204, 206 of housing 102 can contain one battery of two or more distinct sizes, for example an AAA, M, C, D and other size battery.

Front insulator receptacle 124 has at least two battery contacts that are spaced apart. Each battery contact 125, 127, 129, (FIG. 1) is positioned to contact one battery when it is placed in the first battery location 204. Rear insulator receptacle 132 has at least two spaced apart battery contacts, for example, a first, second, and third battery contacts 214, 216, 218 associated with the second battery location 206, and each is positioned to contact one battery when it is placed in the second battery location 206. Conductor strips 222 can run longitudinally along housing 102 to electrically connect the rear battery contacts 214, 216, 218, to the switch 140.

The electro-mechanical structure of flashlight 100 can further include a switch 140 (FIG. 1) which electrically couples the light source 118 (FIG. 1) to the first and second battery locations 204, 206. That is, for each position of the switch 140 as described in (FIG. 1), the switch 140 electrically couples the light source 118 to one battery contact, for example battery contacts 125 (FIG. 1) and 214 (FIG. 2), in each of the first and second battery locations 204, 206, where each one of the battery contacts is positioned to contact a first and a second battery 104, 106 of substantially the same physical size. Furthermore, the switch 140 is capable of preventing a closing of an electrical circuit that electrically couples the at least two batteries 104, 106 to the light source 118 when a first of the at least two batteries and a second of the at least two batteries placed in the first and second battery locations 204, 206 are of distinct sizes.

Flashlight housing 102 can further include a plurality of ribs 220 that extend along the length of the housing 102 and that butt up against the batteries to maintain the batteries in alignment with the front and rear battery contacts. Also the ribs 220 can prevent batteries, for example cylindrical batteries 104, 106, from rolling along the internal surface of housing 102. For example, the ribs 220 can be spaced apart a distance that is greater than the diameter of a smallest size of batteries accommodated by the flashlight 100, for example AA size batteries, and ribs can be spaced apart a distance that is greater than the diameter of a medium size of batteries accommodated by flashlight 100, for example C size batteries.

FIG. 3 is a cross-sectional view of the flashlight housing taken along lines 3—3 of FIG. 2 according to an embodiment of the invention. The battery contacts 125, 127, 129 of front insulator receptacle 128 can lie along the same plane. The distance between the battery contacts is great enough to ensure that the protrusion 302 of the positive terminal of a battery 104 positioned in the first battery location can only contact one battery contact 208 125. Alternatively, some other physical arrangement of the contacts may be employed to ensure that only batteries of the proper size come into contact with each of the battery contacts.

The rear insulator receptacle 132 can have step recesses 304, 306, 308. Each step recess includes one battery contact such that the battery contacts 214, 216, 218, are spaced apart in two dimensions. The spacing between contacts 214, 216, 218 can prevent the negative terminal of a battery of a larger size, for example battery 310 (shown in phantom) which can be a C size battery, from contacting battery contact 214 which is intended for the smaller size battery 106, and ensures the battery in the second battery location 206 contacts only one battery contact, for example, battery contact 216. The depth of the step recesses can vary so long as the surface of each battery contact on each step recess extends beyond the surface of the battery contacts intended for smaller battery sizes. The step recesses 304, 306, 308, can be cylindrical in shape for use with cylindrical batteries, to help properly orient the battery, however, the step recesses may be of other shapes, such as rectangular, square, prismatic, for example, to fit the profile of other types of batteries.

In an alternative embodiment, the front insulator receptacle can have stepped recesses such that the first, second and third battery contacts 125, 127, 129, of the first battery location 204 are spaced apart in two dimensions, the first, second and third battery contacts of rear insulator receptacle 132 can lie substantially along the same plane. Such an arrangement would allow batteries to be placed in the flashlight 100 in a reverse direction. In an alternative embodiment, the front insulator receptacle 128, in addition to the rear insulator receptacle 132, can have stepped recesses. For example, battery contacts 125, 127, 129 of the front insulator receptacle 128 can be spaced apart in two dimensions and attached to step recesses that prevent the terminal of larger physical size batteries from touching a battery contact that is intended for a smaller size battery. Each of the stepped recesses of the insulator receptacle 132 can also have a secondary recess that allows a positive terminal of a battery to contact the battery contact, but prevents a negative terminal from contacting the battery contacts. Such a design can prevent cell reversal of the batteries, in which either the positive terminals of the two batteries 104, 106, contact one another or the negative terminals of the two batteries 104, 106 contact one another.

Front insulator receptacle 128 can be movable and can move longitudinally inside housing 102 so that the at least two batteries, for example batteries 104, 106, can be inserted in the first and second battery locations 204, 206, thereby compressing the spring 126 to form an expandable battery compartment. That is, depending upon the length of the at least two batteries that are inserted, the front insulator receptacle 128 can be forced in a forward direction 312 toward the head assembly 108 to accommodate the combined length of the first and second battery 204, 206. Once the first and second batteries 204, 206 are inserted, the front insulator receptacle 128 is pushed in the rearward direction toward the rear insulator receptacle 132 against the batteries by spring 126 to ensure a contact force against terminals 302 and 314 of the first and second batteries, respectively.

Referring to FIG. 3 the electro-mechanical structure of flashlight 100 can further include a retaining member 316 that is mounted inside housing 102 and can impinge upon and hold the batteries against the wall of the housing 102. Retaining member 316 extends from the housing 102 and can deflect toward the housing to adjust for the various size batteries inserted in the flashlight housing 102. Retaining member 316 as shown in FIG. 3 can be a flexible spring, having an angled surface 318 that can move toward the internal surface of housing 102 upon insertion of batteries and can move away from the housing 102 upon removal of the batteries 104, 106. Retaining member 316 can be one of many mechanical devices that apply a force against at least one battery of two or more sizes.

FIG. 4 is an exploded perspective view of a flashlight 400 according to another embodiment of the invention. The electro-mechanical structure of flashlight 400 may include a battery tray 402 inside housing 404 to contain at least two batteries, for example, batteries 426, 428 (shown in phantom). The "on" and "off" functions of the flashlight 400 can be controlled by the movement of switch 140 located on the battery selector panel 138 of housing 404 as described above. Housing 404 is similar to housing 102 of FIG. 1 described above. The housing 404 of flashlight 400 includes a head assembly 108 that includes a light source 118 which can be, for example, an incandescent light, one or more light emitting diodes, or other types of light source. The housing 404 further includes an end cap assembly 406 that can be unscrewed so that the battery tray 402 can be pulled away from the central portion 408 of the housing 404 to load or change the batteries. The rear end 410 of the battery tray 402 is attached to the end cap 412 and end ring 414 is free to rotate about battery housing to open the flashlight 400.

Several of the features described with respect to the housing 102 of flashlight 100 in FIG. 1 may be included in the battery tray 402. The flashlight 400 can include a front insulator receptacle 416, a rear insulator receptacle 418, and a seating portion 420 which define a battery compartment having a first battery location 422 and a second battery location 424 for the placement of batteries 426, 428. Each battery location is sized to accommodate a single battery, and the single battery can be one of at least two distinct sizes. The rear insulator receptacle 418 can be a separate compartment that resides in battery tray 402 or it can be an integrated member of the rear end of battery tray 402. The rear insulator receptacle 418 can have at least two spaced apart battery contacts, for example battery contacts 430, 432, 434, which can be spaced apart in two dimensions by stepped recessed surfaces to which contacts 430, 432, 434 are connected. The details of the stepped recesses can be the same as that described above with respect to battery contacts 214, 216, 218 in the example embodiment of flashlight 100 (see FIG. 3).

A front insulator receptacle 416 associated with the first battery location 422 contains three battery contacts 440, 442, 444, spaced apart from one another. The three battery contacts can lie along the same plane, or alternatively, can be spaced apart in two dimensions, and details regarding their spacing and orientation can also be the same as that of contacts 125, 127, 129, (FIG. 1) described above in the example embodiment of flashlight 100. The front insulator receptacle 416 can move longitudinally inside housing to provide for longitudinal movement along battery tray 402 to accommodate different size batteries. For example, D size batteries which are longer than C and AA batteries will exert a force against front insulator receptacle 416 and push against spring 448 which allows movement of the front insulator receptacle 416 closer to the light source 118.

Battery tray 402 can also include a plurality of ribs 450 that extend along the length of the housing 404 that act as bumpers to maintain the batteries in alignment with the battery contacts 440, 442, 444 of the first battery location 422 and battery contacts 430, 432, 434, of the second battery location 424.

Figure 5A:
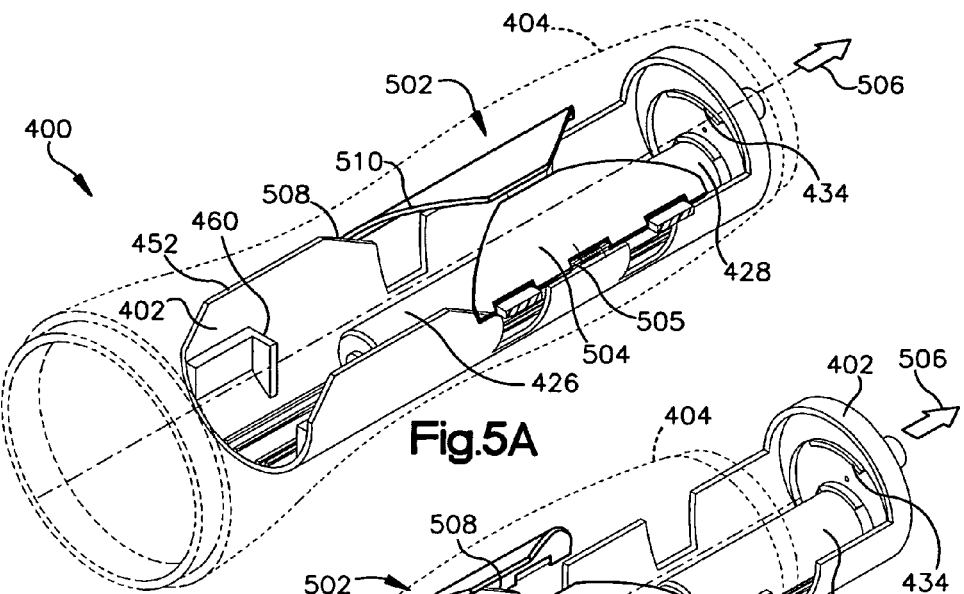
FIGS. 5A and 5B are perspective views of a portion of the flashlight of FIG. 4 having a battery tray according to an embodiment of the invention.
Figure 5B:
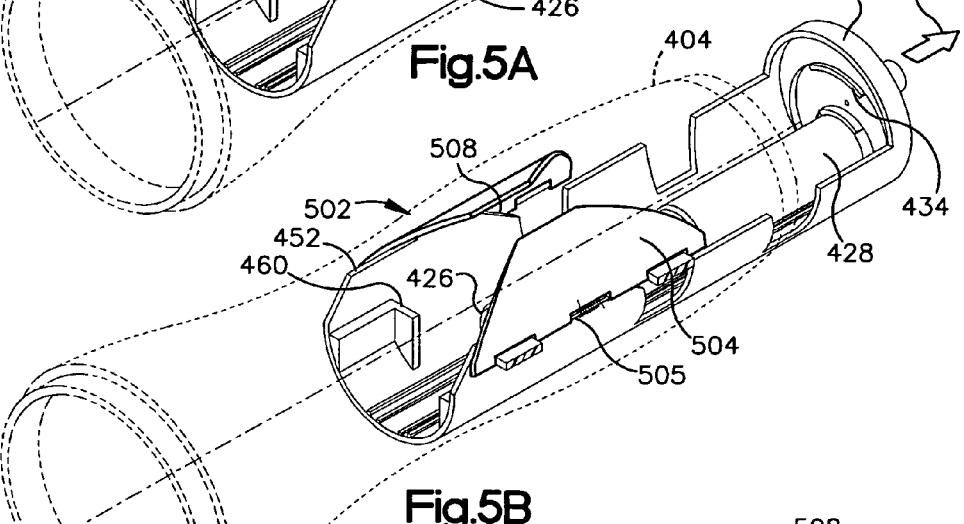

FIGS. 5A and 5B are perspective views of flashlight of FIG. 4 showing the operation of battery tray 402. Flashlight 400 can also include at least one retaining member 502 that is mounted inside housing 404 and can exert a force on the batteries 426, 428 to hold them against the seating portion 420 (FIG. 4) of the battery tray 402. Retaining member 502 can have at least one arm 504 that pivots in a radial direction from the housing 404 to adjust for the various size batteries inserted in the flashlight housing 404. Hinge 505 can be spring-loaded to create a downward force on the arm 504.

In FIG. 5A the battery tray 402 moves along the longitudinal axis of housing 404 as end cap assembly 406 (FIG. 4) is pulled away from the housing 404. As the battery tray 402 is pulled out of housing 404, the movement of angled edge 508 of battery tray 402 engages the edge 510 of the arm 504 of retaining member 502 thereby causing the arm 504 to swing radially upward. FIG. 5B shows that once the arm 504 of the retaining member 502 is lifted the battery tray can be further pulled from the housing 404. A protrusion (not shown) on the battery tray 402 can be mated against a protrusion that extends from the internal surface of housing 404 to stop the movement of the battery tray.

Once the batteries 426, 428, for example two AA size batteries are removed from the battery tray 402, they can be replaced with two C size batteries and the battery tray 402 can be pushed inside housing 404. The switch 140 (FIG. 4) of battery selector panel 138 (FIG. 4) can be moved to the position indicated by two C size batteries to turn on the flashlight. The rear insulator receptacle 418 has recesses 430 (FIG. 4) that can receive shoulders 434 of the battery tray 402 to insure that the battery tray is properly returned to position. The shoulder 434 can support the outer edges of battery 426 in the first battery location 422 to prevent the positive terminal of the battery from becoming damaged, for example in the event that the batteries are slammed against the front insulator receptacle 416. The mating of battery tray 402 with front insulator receptacle 416 can also ensure that the battery contacts of the front insulator receptacle 416 are substantially perpendicular to the batteries and that the front insulator receptacle does not twist.

Figure 6:
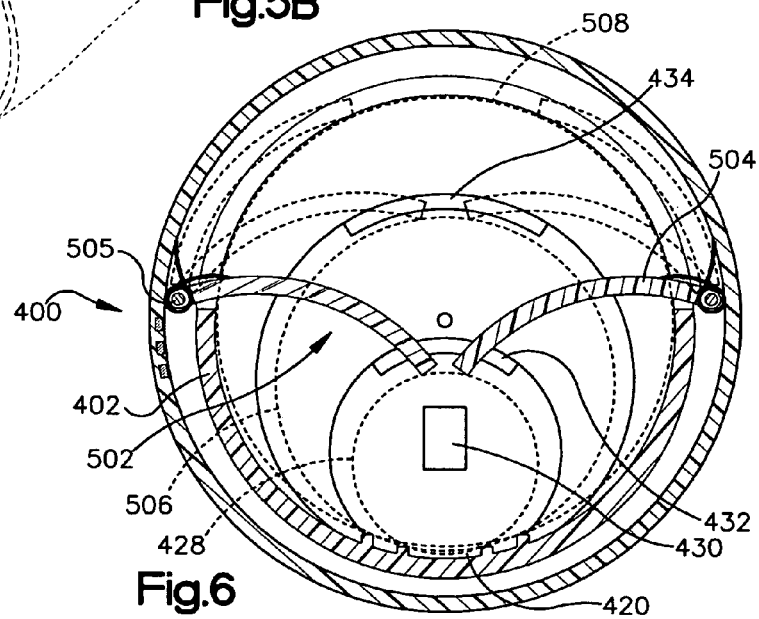
FIG. 6 is a radial cross-sectional view of the flashlight of FIG. 4 according to an embodiment of the invention.

FIG. 6 is a radial cross-sectional view of the flashlight 400 of FIG. 5A, 5B showing various positions of retaining member 502 in contact with different size batteries placed in housing 404 of flashlight 400. Retaining member 502 is shown applying a force to battery 428 (shown in phantom), for example, AA size battery, which holds the battery against battery tray 402. The arms 504 of retaining member 502 are biased downward to the seating position 420 of battery tray 402 to a distance that touches the longitudinal surface of the battery 428 which is seated below second battery contact 432. Retaining member 502 can be connected to the housing 404 and can rotate along hinge 505. Hinge 505 can include a biasing spring or any other mechanical device that allows the retaining member to swivel.

As described above, when the battery tray 402 is extended (FIG. 5B) from the housing 404, the batteries, for example the smaller size batteries such as M size batteries can be removed and, with the arm 504 of retaining member 502 extending upwards, a larger second size battery, for example, C size battery can be placed in the battery tray 402. When the battery tray is pushed into the housing 404 such that the angled edge 508 (FIG. 5A) of the battery tray 402 is pushed past and clears the arms 504 of the retaining member 502, the arms of retaining member can drop to impinge upon the second size battery 506 (shown in phantom) which sits below the third battery contact 434. The arms of retaining member can drop a shorter distance to apply a force to the longitudinal surface of a third size battery 508 (shown in phantom), for example, a D size battery, which might be placed in the battery tray 402. The natural position of arms 504 of retaining member 502 biased downward, is such that distance between the arms 504 to the battery seating position 420 is about equal to the diameter of the smallest size battery accommodated by the flashlight 400. The arms can rotate from its natural position, to a distance as great as the diameter of the largest size battery 508 to be accommodated by the flashlight 400. The arms 504 can be curved to fit around the contour of the cylindrical battery, however, the arms can have alternative cross-sections for batteries of different shape.

FIG. 7A is a longitudinal cross-sectional view of the battery tray 402 in flashlight 400 of FIG. 4 when two of a first size batteries, for example the smallest size batteries accommodated by flashlight 400 are positioned in the first and second battery locations 422, 424 of battery tray 402. The first size batteries 426, 428 are positioned between front insulator receptacle 416 and the rear insulator receptacle 418 and touch battery contact 440 in the first battery location and contact the first battery contact 430 in the second battery location. Retaining member 502 applies a force to the batteries.

FIG. 7B is an electrical schematic that illustrates how an electrical circuit may be closed through the batteries 426, 428, the switch 140, and the light source 118 when the batteries are inserted in the first battery location 422 and the second battery location 424, respectively, of flashlight 400. An electrical circuit can be established from one terminal of the first battery 426 through first battery contact 440 of the first battery location 422, through a conductor 702 to switch 140, and then through another conductor 704 to the light source 118. After passing through the light source 118, the electrical circuit emerges through another conductor 706, to switch 140 and then through another conductor 708 to a first battery contact 430 of a second battery location 422 which touches the second battery 428. Activation of the switch 140 can complete or break the electrical circuit that allows current to pass through light source to turn the flashlight on or off.

FIG. 8A is a longitudinal cross-sectional view of the battery tray 402 of flashlight 400 of FIG. 4 when two of a second size batteries, for example the medium size batteries accommodated by flashlight 400, are positioned in the first and second battery locations 422, 424. The two second size batteries 802, 804 contact the second battery contact 442 in the first battery location 422 and second battery contact 432 in the second battery location 434. As can be seen in FIG. 8A the diameter of the medium battery 804 prevents it from the contact 430 mounted on the lowest recess of the rear insulator receptacle 418. In addition, the diameter of battery 804 is not great enough to touch the contact 434 of the second battery location.

FIG. 8B is an electrical schematic of an electrical circuit that can be established through the batteries 802, 804, a switch 140, and a light source 118 when the batteries are inserted in the first battery location 422 and the second battery location 424, respectively. When, for example, two medium size batteries are placed in the first and second battery locations, an electrical circuit can be established through the batteries 802, 804, the switch 140 and the light source 118 to turn the flashlight on. The switch 140 requires the second battery contact 442 of the first battery location 422 be in electrical connection with the second battery contact 432 of the second battery location 424. Therefore, batteries positioned in the first and the second battery locations 422, 424, must touch the second battery contacts 442, 432 in order to provide power to the light source.

FIG. 9A is a longitudinal cross-sectional view of the battery tray 402 of flashlight 400 containing two of a third size batteries, for example the largest size batteries which can be accommodated by flashlight 400. The third size batteries 902, 904, contact the third battery contact 444 in the first battery location 422 and contact the third battery contact 434 in the second battery location 424. As can be seen in FIG. 9A the circumference of the third size battery prevents it from penetrating to any significant depth within other recesses of the rear insulator receptacle so that it does not come into contact with the first and second contacts 430, 432.

In FIG. 9B, the switch 140 requires the third battery contact 444 of the first battery location 422 be in electrical connection with the third battery contact 434 of the second battery location 424. Therefore, batteries positioned in the first and the second battery location must be in contact with the third battery contacts 444, 434 in order to provide power to the light source.

Switch 140 is independently connected to the first, second and third battery contacts 440, 442, 444 of the first battery location 422, and to the first, second and third battery contacts 430, 432, 434, of the second battery location 424. Conductor strips 222 (FIG. 2) can be positioned longitudinally between battery tray 402 and housing 404, to electrically connect the first, second and third battery contacts 430, 432, 434, associated with the second battery location 424, to switch 140. Three additional contacts (not shown) can electrically connect the first, second, and third battery contacts 440, 442, 444, associated with the first battery location 422 to the switch 140.

It should be understood that the electric circuitry described above in the electrical schematics (FIGS. 7B, 8B, 9B) with respect to flashlight 400 also applies to flashlight 100 of FIGS. 1, 2, and 3.

Figure 10A:
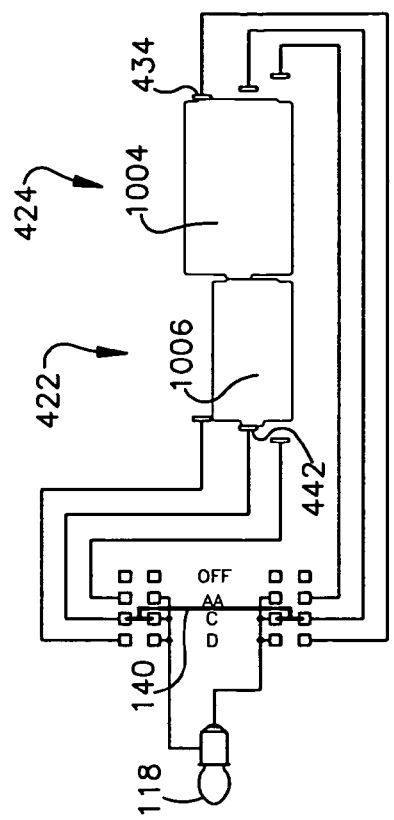
FIGS. 10A and 10B are representative schematics showing a break in the electrical circuit in the flashlight of FIG. 4 where the flashlight contains batteries of different size according to an embodiment of the invention.
Figure 10B:
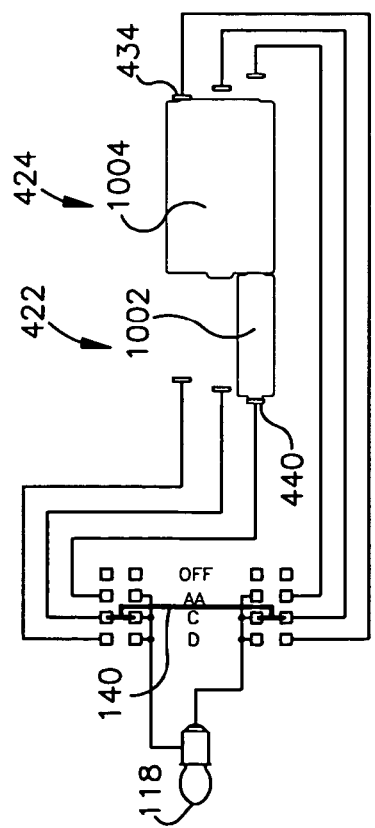

FIGS. 10A and 10B are electrical schematics that illustrate the manner in which an electrical circuit is prevented from being closed when two batteries of a different size are placed inside flashlights 100, 400. In FIG. 10A a first size battery, for example a small AA battery, is placed in the first battery location 422 and a different size battery, for example a large D battery is placed in the second battery location 424. Switch 140 prevents the closing of an electrical circuit between the first battery contact 440 of the first battery position 422 and the third battery contact 434 of the second battery position 424. Therefore, no electrical circuit can be closed between the batteries 1002, 1004, and the light source 118, and the flashlights 100, 400 will remain off. Likewise, in FIG. 10B another size battery 1006, for example a medium C size battery, is placed in the first battery location 422 and the D battery remains in the second battery location 424. Again, the switch 140 prevents the closing of an electrical circuit between the second battery contact 442 of the first battery position 422 and the third battery contact 434 of the second battery position 424, and an electrical circuit cannot be made between the batteries 1004, 1006, the switch 140 and the light source 118.

The example embodiments described above with respect to flashlights 100, 400 (FIGS. 1 and 4) have an electrical-mechanical structure that includes switch 140 and at least two battery contacts in the first battery location and at least two battery contacts in the second battery location. The switch 140 is capable of preventing an electrical circuit that couples the light source 118 and the at least two batteries when at least one of the batteries is different in physical size than the others. A suitable switch 140 can be any switch, for example, a double-pole switch that can move to two or more positions, and that is capable of preventing an electrical circuit between the batteries and the light source when at least one of the batteries located in the flashlight is different from the rest.

FIG. 11 is a cross-sectional view of a flashlight 1100 according to another embodiment of the invention. The electro-mechanical structure of flashlight 1100 can be similar to the flashlight 400 (FIG. 4), however, the battery tray 1102 has first, second and third battery locations 1108, 1110, 1112, internal to housing 1104, and each battery location is capable of accommodating one of at least two batteries of distinct sizes. The battery tray 1102 can include an insulator receptacle 1106 between the first battery location 1108 and the second battery location 1110 as shown. In an alternative embodiment the insulator receptacle 1106 can be located between the second battery location 1110 and the third battery location 1112. Insulator receptacle 1106 as shown separates the battery 1105 from 1107 such that at least two of the three batteries are unable to physically contact each other.

Insulator receptacle 1106 can have at least two battery contacts, for example battery contacts 1114, 1116, 1118, facing the first battery location 1108 and battery contacts 1120, 1122, 1124, facing the second battery location 1110. Battery contacts 1114, 1116, 1118, can be spaced apart in two dimensions by stepped recessed surfaces to ensure that each battery of a different size in the first battery location contacts only one battery contact. The arrangement of the battery contacts, for example, battery contacts 1130, 1132, 1134 mounted on insulator receptacles 1136, and battery contacts 1140, 1142, 1144 mounted on insulator receptacle 1146 can be similar to the arrangement of battery contacts 430, 432, 434 of insulator receptacle 418 (FIG. 4), and battery contacts 440, 442, 444 of insulator receptacle 416 (FIG. 4) described above for the flashlight 400. That is, each of the contacts can be spaced apart in two dimensions and mounted on recesses that allows contact by a battery of a predefined size. Insulator receptacle 1106 can also be movable, so that when batteries 1105, 1107, 1109, are inserted into battery tray 1102, the insulator receptacle 1106 can be moved in conjunction with spring 1120 to accommodate different combined lengths of the batteries.

In FIG. 12, the battery tray 1202 has four battery locations internal to housing 1204, and each battery location is capable of accommodating one of at least two batteries of distinct sizes. The battery tray 1202 can include an insulator receptacle 1206 between the second battery location 1208 and the third battery location 1210 as shown. Insulator receptacle 1206 can be the same as insulator receptacle 1106 of FIG. 11. Flashlights 1100 and 1200 can also include retaining members 1130, 1230, which can be any device that impinges upon the batteries, including, but not limited to, retaining members 316 (FIG. 3) and 502 (FIG. 5A).

In FIGS. 11 and 12, switch 140 can be movable in two or more positions described above, to electrically couple the light source to a battery contact in the three and four battery locations when the batteries are the same size. Switch 140 will also prevent a closing of an electrical circuit that couples the three or four batteries to the light source 118 when the size of one of the batteries differs in physical size from the others.

With reference to FIG. 13A, shown is a side view of various components of an electro-mechanical structure of flashlight 1300 according to another embodiment of the present invention. The flashlight 1300 includes a housing 1303 (shown in phantom) that is similar to housing 404 (FIG. 4) described above. Within the housing 1303 defines battery locations 1305, 1306 within which batteries 1307, 1308 are positioned. In this respect, the flashlight 1300 includes a head assembly 1309 that includes a light source 1313. The light source 1313 may be, for example, a light bulb, one or more light emitting diodes, or other light source. The flashlight 1300 includes an insulator receptacle 1316. A first battery contact 1319 is mounted on the front insulator receptacle 1316. The front insulator receptacle 1316 may be structurally similar to the insulator receptacles 128, 416 discussed above, for example, with reference to FIGS. 1, 4, with the exception that the first battery contact 1319 is a single contact that comes into contact with an electrode of all batteries 1307, 1308 regardless of their size.

The insulator receptacle 1316 is attached to a spring 1323 that in turn mates with the head assembly 1309. The first battery contact 1319 is electrically coupled to the spring 1323 that is also electrically conductive. The spring 1323 is, in turn, electrically coupled to the light source 1313. As a result, the first battery contact 1319 is electrically coupled to the light source 1313.

The flashlight 1300 also includes a pair of leaf springs 1326. Each leaf spring 1326 is associated with a respective one of the battery locations 1305, 1306. While two leaf springs 1326 and two battery locations 1305, 1306 are shown, it is understood that there may be more than two battery locations with corresponding leaf springs 1326. The apex 1329 of each of the leaf springs 1326 projects into its corresponding battery location 1305, 1306.

Each of the leaf springs 1326 is electrically conductive and includes both a stationary end contact 1331 and a moveable end contact 1333. In this respect, for each leaf spring 1326, the moveable end contact 1333 is moveable along a longitudinal axis inside housing 1303 associated with the respective leaf spring 1326 as will be discussed. The stationary end contact 1331 of one of the leaf springs 1326 is electrically coupled to a second battery contact 1336 at a rear end of the flashlight 1300. Also, the stationary end contact 1336 of the other leaf spring 1326 is electrically coupled to the light source 1313 through conductor 1339 and switch 1341. The conductor 1339 may be, for example, a metal strip or other electrically conductive element. Alternatively, the switch 1341 may be located at some other point on the loop and the conductor 1339 may be coupled directly from the respective stationary end contact 1336 to the light source 1313 through the head assembly. The switch 1341 may be, for example, a pushbutton.

The flashlight 1300 also includes a number of bridge conductors 1343. The ends of the bridge conductors 1343 terminate into bridge contacts 1346. Each bridge contact 1346 is positioned to make electrical contact with one of the moveable end contacts 1333 along the longitudinal axis of a respective one of the leaf springs 1326 as the end contacts 1333 are moved along the longitudinal axis as will be discussed.

The components of the flashlight 1300 described above provide an illustration of electro-mechanical structure that prevents a closing of an electrical circuit that electrically couples the at least two batteries 1307, 1308 to the light source 1313 when two batteries 1307, 1308 of a different size are placed in the respective battery locations 1305, 1306. In this respect, a user places the batteries 1307, 1308 in the flashlight 1300 by removing an end cap of the flashlight as described above. Due to the compression of the leaf springs 1326 and the placement of the bridge contacts 1346, an electrical circuit is created from the light source 1313 through the spring 1323, the first contact 1319, the batteries 1307, 1308, the second contact 1336, the leaf springs 1326, one of the bridge conductors 1343, the conductor 1339, and the switch 1341, and back to the light source 1313. The size of the batteries 1307 dictates a displacement of the apex 1329 of the leaf springs 1326, and, ultimately determines which one of the bridge conductors 1343 through which the electrical circuit is established.

That is to say, when batteries 1307, 1308 are positioned in the battery locations 1305, 1306, the sides of each battery 1307, 1308 comes into contact with an apex 1329 of a respective one of the leaf springs 1326. The positioning of the batteries results in a force applied to the apex 1329 of each of the leaf springs 1326 that displaces the apex 1329.

The displacement of the apex 1329 of each of the leaf springs 1326 causes the moveable end contact 1333 associated therewith to move along the longitudinal axis of the respective leaf spring 1326. Given that each battery is of a given size (i.e. a predefined diameter), then the apex 1329 of each of the conductive leaf springs 1326 is displaced by a predefined distance for each type of battery 1307 that is compatible with the flashlight 1300. Consequently, the moveable end contacts 1333 are moved along the longitudinal axis of their associated leaf springs 1326 by a corresponding predefined distance for each type of battery 1307, 1308 placed in the battery positions 1305, 1306.

The bridge conductors 1346 are positioned so as to ensure that the electrical circuit is created only when the batteries 1307 are of the same size. That is to say, that the bridge conductors 1346 are positioned so that one of the bridge conductors 1343 electrically couples the leaf springs 1326 to each other when the apex 1329 of the respective conductive leaf springs 1326 is displaced by the same predefined distance due to the placement of the same size battery 1307, 1308 in each of the battery locations 1305, 1306. Each of the predefined distances that each apex 1329 may be displaced is associated with the size of a respective one of the types of batteries that are compatible with the flashlight 1300 such as sizes AAA, AA, C, D, or other sizes.

Thus, if batteries of two or more sizes are placed in the battery locations 1305, 1306, then the electrical circuit is not established. Consequently, the power from the batteries 1307, 1308 is prevented from reaching the light source 1313. In this respect, the flashlight 1300 includes the electro-mechanical structure that prevents the closing of an electrical circuit that electrically couples the batteries 1307, 1308 to the light source 1313 when at least two of the batteries are of a different size. In this respect, the batteries 1307, 1308 may be of any predefined size such as, for example, AAA, AA, C, and D sizes described above as is generally known by those with ordinary skill in the art.

In addition, when no batteries 1307, 1308 are placed in the flashlight 1300, each of the leaf springs 1326 are biased so that their respective moveable end contacts 1333 make electrical contact with the bridge contacts 1346 of one of the bridge conductors 1343, thereby establishing the electrical circuit described above. In this respect, the apex 1329 of each of the leaf springs 1329 is in position to contact the side of a smallest battery that may be used in the flashlight 1300. The smallest battery may be, for example, an AA size battery or a battery of some other size. Consequently, the smallest battery 1307, 1308 compatible with the flashlight 1300 may not actually displace the apex 1329 of any of the leaf springs 1326.

In addition, the insulator receptacle 1316 moves in both directions along a longitudinal axis of the flashlight 1300 to accommodate the varying lengths of the different types of batteries 1307. The spring 1323 exerts a force against the insulator receptacle 1316 to compress the batteries 1307, 1308, thereby ensuring good electrical contact between the first and second battery contacts 1319 and 1336.

With reference to FIG. 13B, shown is a top view of various components of the electro-mechanical structure of the flashlight 1300. The top view illustrates more clearly the longitudinal axis 1349 associated with each respective leaf spring 1326. The view of FIGS. 13A and 13B provide an illustration of the state of the electro-mechanical structure in the flashlight 1300 when two batteries of a smallest size are placed in the battery locations 1305 and 1306 according to an embodiment of the present invention. In this respect, the leaf springs 1326 are in a biased state with no displacement of the moveable end contacts 1333 associated therewith.

Turning to FIGS. 14A and 14B, shown is an illustration of the state of the electro-mechanical structure in the flashlight 1300 when two batteries of a medium size are placed in the battery locations 1305 and 1306 according to an embodiment of the present invention. In this respect, the leaf springs 1326 are compressed such that the moveable end contacts 1333 make electrical contact with an intermediate one of the bridge conductors 1343.

With reference to FIGS. 15A and 15B, shown is an illustration of the state of the electro-mechanical structure in the flashlight 1300 when two batteries of a largest size compatible with the flashlight 1300 are placed in the battery locations 1305 and 1306 according to an embodiment of the present invention. In this respect, the leaf springs 1326 are compressed such that the moveable end contacts 1333 make electrical contact with the bridge conductor 1343 having bridge contacts 1346 that are located at the greatest displacement of the moveable end contacts 1331 along the longitudinal axes of the respective leaf springs 1326.

In addition, it is understood that there may be more than two battery positions 1305, 1306, wherein each battery position includes a corresponding leaf spring 1326. In such case, intermediate bridge conductors 1343 would be employed to provide for a continuous electrical pathway through each of the leaf springs 1326 included therein.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A flashlight, comprising:
a light source;
a housing;
at least two battery locations internal to the housing for the positioning of at least two batteries, each of the battery locations being capable of accommodating one of the at least two batteries, one of the at least two batteries being one of at least two different sizes; and
an electro-mechanical structure comprising
a switch that prevents closing of an electrical circuit that electrically couples the at least two batteries to the light source when the size of a first of the at least two batteries differs from the size of a second of the at least two batteries;

at least two first battery contacts associated with a first one of the at least two battery locations, wherein said at least two first battery contacts lie in substantially the same plane and are mounted on an insulator receptacle that can move longitudinally inside the housing; and at least two second battery contacts associated with a second one of the at least two battery locations.

2. The flashlight of claim 1, wherein:

a first one of the at least two first battery contacts and a first one of the at least two second battery contacts being positioned to contact a first battery of a first predefined size; and a second one of the at least two first battery contacts and a second one of the at least two second battery contacts being positioned to contact a second battery of a second predefined size.

3. The flashlight of claim 2, wherein the switch further comprises:

a first position that electrically couples the first ones of the at least two first and second battery contacts to the light source; and a second position that electrically couples the second ones of the at least two first and second battery contacts to the light source.

4. The flashlight of claim 3, further comprising:

a third one of the at least two first battery contacts associated with the first one of the at least two battery locations;

a third one of the at least two second battery contacts associated with the second one of the at least two battery locations;

the third one of the at least two first battery contacts and the third one of the at least two second battery contacts being positioned to contact a third battery of a third predefined size; and the switch comprises a third position that electrically couples the third ones of the at least two first and second battery contacts to the light source.

5. The flashlight of claim 1, wherein the electro-mechanical structure further comprises a retaining member internal to the housing capable of impinging on the at least two batteries when they are positioned in the at least two battery locations.

6. The flashlight of claim 5, wherein the retaining member comprises a spring that extends between the housing and the at least two battery locations.

7. The flashlight of claim 5, wherein the retaining member comprises a movable arm that pivots about an axis between the housing and the at least two battery locations.

8. The flashlight of claim 1, wherein the electro-mechanical structure comprises a battery tray disposed inside the housing.

9. The flashlight of claim 8, wherein the battery tray can move longitudinally inside the housing and to a position external to the housing.

10. The flashlight of claim 9, wherein the electro-mechanical structure further comprises:

a retaining member internal to the housing capable of impinging on the at least two batteries when they are positioned in the at least two battery locations; and the retaining member can be moved toward and away from the at least two battery locations when the battery tray is moved longitudinally.

11. The flashlight of claim 1, wherein at least two second battery contacts are each positioned to prevent electrical contact with a battery of a size that differs from a predetermined size associated with each of the at least two second battery contacts, respectively.

12. The flashlight of claim 11, wherein each of the at least two second battery contacts are positioned to prevent contact of a positive terminal of a battery of any size.

13. The flashlight of claim 1, wherein the electro-mechanical device further comprises a battery tray that defines a first battery location, a second battery location and a third battery location.

14. The flashlight of claim 13, wherein the battery tray comprises an insulator receptacle disposed between first and second ones of battery locations.

15. The flashlight of claim 1, wherein the electro-mechanical structure further comprises a battery contact electrically coupled to the light source.

16. A flashlight, comprising:

a light source;

a housing;

at least two battery locations internal to the housing for the positioning of at least two batteries, each of the battery locations being, capable of accommodating one of the at least two batteries, one of the at least two batteries being one of at least two different sizes; and an electro-mechanical structure comprising;

a switch that prevents closing of an electrical circuit that electrically couples the at least two batteries to the light source when the size of a first of the at least two batteries differs from the size of a second of the at least two batteries;

at least two first battery contacts associated with a first one of the at least two battery locations; and at least two second battery contacts associated with a second one of the at least two battery locations wherein the at least two second battery contacts are mounted on a rear insulator receptacle that has at least two step recesses, and one of the at least two second battery contacts is mounted on each of the at least two step recesses.

17. The flashlight of claim 16, wherein the rear insulator receptacle further comprises a portion of a battery tray inside the housing.

18. The flashlight of claim 16, wherein the switch is a two-pole, three position switch.

19. A flashlight, comprising:

a light source;

a housing;

at least two battery locations internal to the housing for the positioning of at least two batteries, each of the battery locations being capable of accommodating one of the at least two batteries, one of the at least two batteries being one of at least two different sizes; and an electro-mechanical structure comprising a switch that prevents closing of an electrical circuit that electrically couples the at least two batteries to the light source when the size of a first of the at least two batteries differs from the size of a second of the at least two batteries;

a battery tray that defines a first battery location, a second battery location and a third battery location, wherein the battery tray comprises an insulator receptacle disposed between first and second ones of battery locations;

at least two first battery contacts associated with the first battery locations;

at least two second battery contacts associated with the second battery locations;

at least two third battery contacts associated with the third battery locations;

a first one of the at least two first battery contacts, a first one of the at least two second battery contacts, and a first one of the at least two third battery contacts being positioned to contact a first battery of a first predefined size; and a second one of the at least two first battery contacts, a second one of the at least two second battery contacts, and a second one of the at least two third battery contacts being positioned to contact a second battery of a second predefined size.

20. The flashlight of claim 19, wherein the switch further comprises:

a first position that electrically couples the first ones of the at least two first and second battery contacts to the light source; and a second position that electrically couples the second ones of the at least two first and second battery contacts to the light source.

21. A flashlight, comprising:

a light source;

a housing;

at least two battery locations internal to the housing for the positioning of at least two batteries, each of the battery locations being capable of accommodating one of the at least two batteries, one of the at least two batteries being one of at least two different sizes; and an electro-mechanical structure that prevents a closing of an electrical circuit that electrically couples the at least two batteries to the light source when a first of the at least two batteries and a second of the at least two batteries are of distinct sizes, wherein the electro-mechanical structure further comprises a battery contact electrically coupled to the light source, and wherein the battery contact is mounted on a moveable insulator receptacle.

22. The flashlight of claim 21, wherein the battery contact is coupled to the light source through a conductive spring.

23. A flashlight, comprising:

a light source;

a housing;

at least two battery locations internal to the housing for the positioning of at least two batteries, each of the battery locations being capable of accommodating one of the at least two batteries, one of the at least two batteries being one of at least two different sizes; and an electro-mechanical structure that prevents a closing of an electrical circuit that electrically couples the at least two batteries to the light source when a first of the at least two batteries and a second of the at least two batteries are of distinct sizes;

wherein the electro-mechanical structure further comprises at least two leaf springs, each of the at least two leaf springs being associated with a respective one of the battery locations, each of the leaf springs further comprises a conductive leaf spring; one of the conductive leaf springs is coupled to a first battery contact; and a second one of the conductive leaf springs is electrically coupled to the light source.

24. The flashlight of claim 23, wherein the second one of the conductive leaf springs is electrically coupled to the light source through a switch.

25. The flashlight of claim 24, wherein each of the leaf springs further comprises a conductive leaf spring, and the electro-mechanical structure further comprises at least two bridge conductors, each of the bridge conductors having a pair of bridge contacts, wherein one of the bridge conductors electrically couples a first one of the conductive leaf springs with a second one of the conductive leaf springs when an apex of each of the conductive leaf springs is displaced by one of a number of predefined distances.

26. The flashlight of claim 25, wherein each of the predefined distances is associated with the size of a respective one of the at least two batteries.

27. A flashlight, comprising:

a light source;

a housing;

at least two battery locations internal to the housing for the positioning of at least two batteries, each of the battery locations being capable of accommodating, one of the at least two batteries, one of the at least two batteries being one of at least two different sizes; and an electro-mechanical structure that prevents a closing of an electrical circuit that electrically couples the at least two batteries to the light source when a first of the at least two batteries and a second of the at least two batteries are of distinct sizes;

wherein the electro-mechanical structure further comprises at least two conductive leaf springs, each of the at least two leaf springs being associated with a respective one of the battery locations, wherein each of the at least two conductive leaf springs further comprises a pair of end contacts, wherein a compression of an apex of each conductive leaf spring causes a displacement of one of the end contacts in the common plane with respect to the other of the end contacts.

28. A flashlight, comprising:

a light source;

a housing;

at least two battery locations internal to the housing for the positioning of at least two batteries, each of the battery locations being capable of accommodating one of the at least two batteries, one of the at least two batteries being one of at least two distinct sizes;

at least two conductive leaf springs, each of the at least two conductive leaf springs being associated with a respective one of the battery locations, wherein an apex of each of the at least two conductive leaf springs projects into the respective one of the battery locations, wherein one of the conductive leaf springs is coupled to a first battery contact, and a second one of the conductive leaf springs is electrically coupled to the light source; and at least two bridge conductors, each of the bridge conductors having a pair of bridge contacts, wherein one of the bridge conductors electrically couples a first one of said conductive leaf springs with a second one of said conductive leaf springs when said apex of each of the conductive leaf springs is displaced equally by their corresponding batteries that are of equal size, and said bridge conductors further preventing a closing of an electrical circuit for said light source when said apex of each conductive leaf spring is displaced at different distances by their corresponding batteries that are of different sizes.

* * * * *